United States Patent

[11] 3,563,566

| [72] | Inventor | Steven L. Weber |
| | | Rte. 5, Box 733, Oregon City, Oreg. 97027 |
| [21] | Appl. No. | 767,707 |
| [22] | Filed | Oct. 15, 1968 |
| [45] | Patented | Feb. 16, 1971 |

[54] VEHICLE STABILIZING MEANS
5 Claims, 4 Drawing Figs.

[52] U.S. Cl. .................................................. 280/124,
267/11, 280/112
[51] Int. Cl. .................................................. B60g 9/00
[50] Field of Search .................................................. 280/6, 6.11,
112, 112.1, 124, 124 (F); 267/11 (A)

[56] References Cited
UNITED STATES PATENTS
3,184,867  5/1965  Symmank .................... 280/6.11X 3,396,984  8/1968  Cadiou ........................ 280/6.11

Primary Examiner—A. Harry Levy
Attorney—Kolisch & Hartwell

ABSTRACT: A vehicle including a pair of fluid-operated rams disposed adjacent opposite sides thereof, with each ram interposed, and accommodating relative movement, between the vehicle's frame and an axle beneath the frame. Interconnecting the rams is a conduit system including a valve which is adjustable from within the vehicle's cab to control fluid flow to and from the rams. In one position, the valve produces fluid interchange between the rams whereby a change in the effective length of one causes a related change in the effective length of the other. In another position, the valve frees the rams for independent operation.

PATENTED FEB 16 1971

3,563,566

Steven L. Weber
INVENTOR
BY
Rolisch + Hartwell
Attys.

VEHICLE STABILIZING MEANS

This invention pertains to vehicle-stabilizing means, and more particularly, to means for minimizing lateral swaying and shifting of a vehicle frame relative to the suspension system supporting the frame.

An occurrence familiar to most drivers is that during cornering of a vehicle, that side of the vehicle body which is on the inside of the curve tends to climb with respect to the outside portion. There may also be some relative lateral movement of the body with respect to the vehicle and structure. While such relative movements, commonly collectively referred to as side sway, may be permitted under certain circumstances, there are other situations, as when handling heavy loads, where it presents a safety hazard, and thus should be minimized.

A general object of the present invention, therefore, is to provide novel stabilizing means for a vehicle which can be adjusted selectively to stabilizing and nonstabilizing states to take care of different kinds of driving circumstances.

Another object of the invention is to provide such stabilizing means wherein an adjustment of the kind just mentioned can conveniently be made by a vehicle operator from a position within the cab in the vehicle.

A further object is to provide stabilizing means as outlined which may readily be employed on many different types of vehicles. According to one embodiment of the invention, an organization is contemplated which principally takes care of the tendency of a vehicle body, during a turn, to climb or elevate on the side which is on the inside of the curve. This is done by resisting any tendency for one side of the vehicle to elevate independently of the other. According to another embodiment of the invention, a stabilizing means in contemplated which also is effective in inhibiting relative side-shifting of a vehicle body with respect to underlying axle structure.

These and other objects and advantages attained by the invention will become more fully apparent as the description which follows is read in conjunction with the accompanying drawings, wherein.

Figure 1:
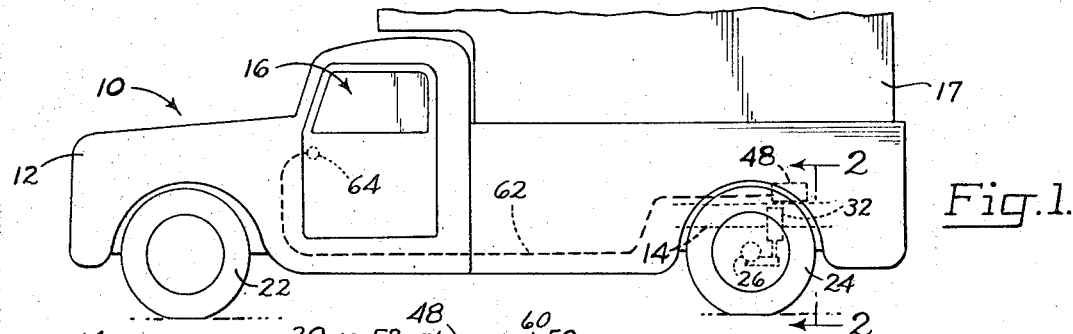
FIG. 1 is a simplified fragmentary side elevation, illustrating a pickup truck employing one embodiment of stabilizing means constructed according to the invention.

Turning now to the drawings, and referring first to FIG. 1, indicated generally at 10 is a pickup truck, or vehicle, including a body 12 mounted on the usual frame shown partially in dashed lines at 14. Body 12 includes a cab 16, and is shown supporting a load such as camper unit 17 disposed rearwardly of the cab.

Figure 2:
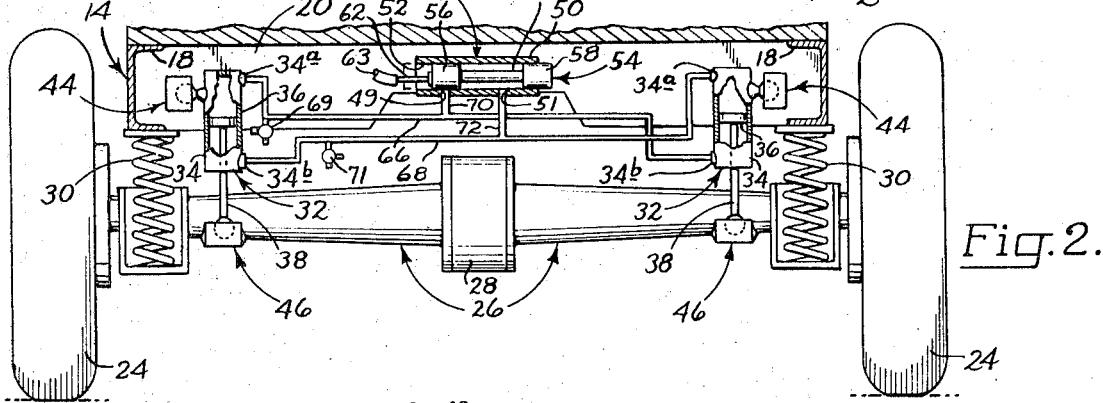
FIG. 2 is an enlarged, simplified, cross-sectional view taken generally along the line 2-2 in FIG. 1, illustrating details of the stabilizing means employed in the truck of FIG. 1.

Referring to FIGS. 1 and 2, together, in the truck shown, frame 14 comprises a pair of laterally spaced longitudinal members 18 joined by transverse members, such as transverse member 20. The frame is supported for travel over the ground through a suspension system including front-wheel assemblies, such as wheel assembly 22, and rear-wheel assemblies, such as those shown at 24. The rear suspension system, which includes rear-wheel assemblies 24, also comprises axle structure such as that shown at 26 including differential 28 from which power is derived for propelling the vehicle. The vehicle body and frame are mounted in a position over the axle structure by means including conventional springs such as those exemplified at 30. It is appreciated that the suspension system provided in a vehicle is subject to considerable variation depending upon the source and the year of manufacture, and it is not intended by illustrating an exemplary suspension system to exclude all other forms which are well known in the art.

The most troublesome type of sway noted by the inventor is the tendency on making a turn for that part of the vehicle which is on the inside of the turn to rise and that part of the vehicle which is on the outside of the turn to dip. The modification of the invention shown in FIGS. 1 and 2 is particularly well adapted for inhibiting this condition.

Referring to FIG. 2, located between the axle structure and the frame of the vehicle are a pair of fluid-operated rams, or extensible devices, 32. Rams 32 are similar in construction, each including a cylinder 34 and a piston 36 mounted for reciprocation within the cylinder and forming fluid-holding chambers in the cylinder on opposite side of the piston. The cylinder in each ram includes ports 34a, 34b, through which pressure fluid is directed in extending an contracting the ram. In extending the ram, pressure fluid is admitted through port 34a and exhausted from port 34b and to contract the ram the reverse flow takes place.

Rams 32 are disposed in upright positions adjacent opposite sides of frame 14. With the vehicle at rest, the rams are in partially extended states, as shown. The ram cylinders are mounted on transverse frame member 20 through ball joint units 44, and their rod ends are mounted on axle structure 26 through ball joint units 46.

Indicated generally at 48 in FIGS. 1 and 2 is a two-way valve. As can be seen in FIG. 2, valve 48 comprises an elongated housing 50 including an internal elongated axial bore 52. Communicating with the interior of bore 52 at points spaced along the length thereof are passages 49, 51 which open to the outside of the housing.

Slidably mounted within bore 52 is valve spool 54. Spool 54 includes a pair of axially spaced, large-diameter end portions 56, 58 which are joined by a smaller diameter medial portion 60. The outsides of end portions 56, 58 are suitably sealed to the inside of bore 52. With the spool in the position illustrated in solid outline in FIG. 2 (referred to as a closed position for the valve). it blocks communication between passages 49, 51 through bore 52. With the spool positioned as illustrated in dashed outline (referred to as an open position for the valve), passages 49, 51 are connected through bore 52.

Valve 48 is shown located under the body of the vehicle substantially midway between rams 32 at the vehicle's rear end. This places the valve adjacent the rams, and permits the use of short lengths of hose in connecting the valve to the rams. The valve may be secured to the vehicle frame in any suitable manner.

Means is provided according to the invention for adjusting the position of valve spool 54 from within cab 16. In the embodiment illustrated, such means comprises a conventional elongated pull cable 62 contained within the usual elongated hollow sleeve 63. The end of cable 63 shown in FIG. 2 is suitably fastened to end portion 56 in the spool, and the cable extends therefrom to an opposite end within cab 16. Inside the cab, a suitable pull knob, or valve-adjusting means, 64 is fastened to such opposite end of the cable 62. It will be appreciated that through manipulation of knob 64, valve spool 54 may be adjusted selectively, to place the valve either in its closed or its open position.

Valve 48 forms part of conduit system, or means, herein interconnecting the cylinders in the rams. The conduit means further includes, and referring to FIG. 2, a pair of conduits 66, 68 extending between rams 32. The left ends of conduits 66, 68, in FIG. 2 are connected to ports 34a34b, respectively, of the left ram 32 in the figure, and the right ends of these conduits are connected to ports 34b34a respectively, of the right or other ram. Conduit 66 communicates with passage 49 in the valve through a conduit 70, and conduit 68 communicates with passage 51 through a conduit 72. Shown at 69, 71 are cocks employed in filling the rams and conduit system with hydraulic fluid.

Explaining how the stabilizing means described may be installed on the vehicle, before rams 32 are finally mounted in place, hydraulic fluid is first introduced into the rams, and into the conduit system interconnecting them. Further explaining, and prior to connecting the rod ends of the rams to the axle structure through units 46, a supply of hydraulic fluid is connected to the conduit system through cocks 69, 71. Valve 48 may be adjusted to its open position. Each of the rams is then extended and contracted multiple times by manipulation of its free rod end. This functions to fill the rams and conduit system with hydraulic fluid, with purging of air. Both rams are then fully contracted by pushing upwardly on the rods' ends, and the cocks then closed with disconnecting of the source of hydraulic fluid from the system.

Each ram is then partially extended by pulling down on its rod end, and its rod end then anchored in place using a unit 46. With partial extension of each ram, and since the cylinder space above the ram's piston has a larger cross section than the cylinder spaced below the piston, less fluid is expelled from the base of the ram than is supplied to the top of the ram. As a consequence, a void space results within each ram above the ram's piston. Each ram is held in its partially extended state by reason of the cylinder being anchored to the frame of the vehicle, and its rod end being anchored to the axle structure.

Explaining how the apparatus described operates during vehicle travel, with valve 48 open, i.e., with its valve spool in the position indicated by dashed lines, upper port 34a of each ram is connected through the conduit system and valve to the lower port 34b in the ram. This permits each ram to extend and contract independently of the other ram, with fluid in the bottom of the ram being fed into the top of the ram when it extends, and reverse flow occurring on contraction. With this adjustment of the valve the stabilizing means, therefore, is in what is referred to herein as a nonstabilizing state.

To adjust the stabilizing means to a stabilizing state, valve 48 is closed, i.e. the spool in the valve is adjusted to the position shown in solid outline in FIG. 2. With this position of the valve, the upper port 34a of the left ram in FIG. 2 is connected only with the lower port 34b of the right ram, and the upper port 34a of the right ram connects only with the lower port 34b of the left ram. With this condition existing, contraction of one ram, for instance the left ram, can only occur if a related or similar contraction occurs in the right ram. Similarly, with any extension in one of the rams a similar or related extension takes place in the other ram. The vehicle, therefore, on rounding a curve at any speed will be maintained approximately level by the stabilizing means, with any tendency for one side of the vehicle to elevate independently of the other being resisted.

Figure 3:
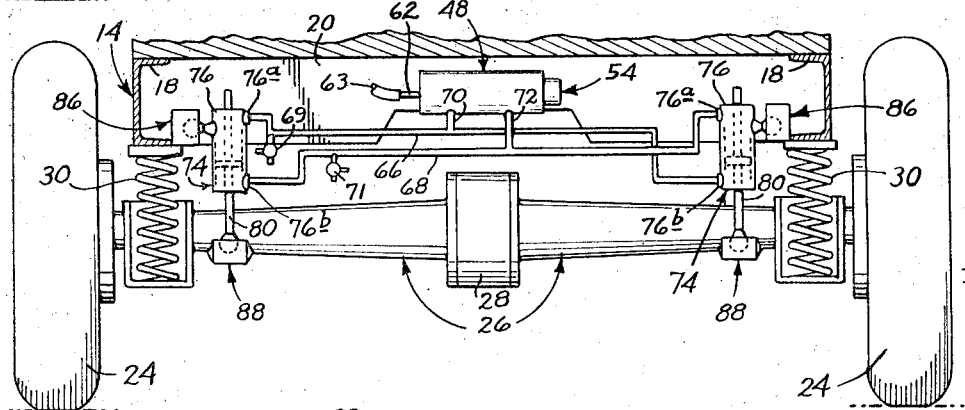
FIG. 3 is a view similar to FIG. 2 illustrating a modified form of stabilizing means constructed according to the invention.

FIG. 3 illustrates another modification of the invention. In this modification, rams 74 are disposed in upright positions between frame 14 and axle structure 26. Each ram includes an elongated cylinder 76 having ports 76a, 76b adjacent its upper and lower ends, respectively. The rams are mounted on frame 14 and on axle structure 26 through ball joint units 86, 88, which correspond to units 44, 46 previously described.

The cylinders in rams 74 are interconnected through substantially the same conduit system as that shown interconnecting rams 32 in FIG. 2.

In this modification of the invention, each ram is provided with an elongated rod shown at 80 which has sufficient length to extend entirely between opposite ends of the ram in any condition of the ram. With the longer rod, when the ram changes its effective length, the volume of fluid ejected from one end of the ram is equal to the volume of fluid drawn into the opposite end. With the construction, shown in FIG. 3, therefore, and with the internal diameters of the two ram cylinders being the same, there is essentially an exact relationship between the change in length occurring in one ram and the change of length which occurs in the other ram.

Figure 4:
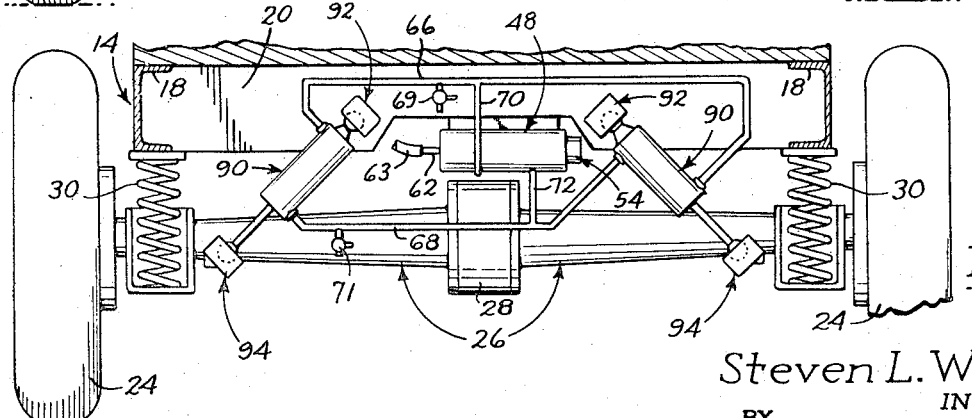
FIG. 4 is another view similar to FIG. 2, illustrating another modified form of stabilizing means.

Referring now to FIG. 4 in the drawings, here there is illustrated a modification of the invention which not only inhibits elevating of one side of the vehicle independently of the other, but which also functions significantly to inhibit relative lateral shifting of the vehicle body on its frame with respect to the underlying axle structure on the vehicle making a turn. In this modification of the invention, rams are shown at 90 on opposite sides of the vehicle which, with the vehicle at rest, occupy inclined positions. More specifically, ball joint units 92 which anchor the upper ends of the rams are disposed more inwardly from the sides of the vehicle than ball joint units 94 which anchor the opposite or lower ends of the rams. The rams are shown inclined toward each other progressing in an upward direction, although alternatively a reverse slope for the rams could be employed. Because in the inclined positions of the rams, on a ram extending (or contracting) counter forces are produced along an inclined line, and the inclined lines along which such counter forces are produces for the two rams slope toward each other progressing toward the midregion of the vehicle.

The conduit system interconnection rams 90 may be the same or similar to the conduit systems discussed in connection with the modifications of the invention shown in FIGS. 2 and 3.

With this modification of the invention, and with relative upward (or downward) movement of the vehicle body and frame with respect to one side of the vehicle and the axle structure therebeneath, as in the other modifications of the invention discussed, a similar and related movement occurs on the other side of the vehicle. It should further be noted, however, that on the vehicle body and frame tending to shift laterally relative to the underlying axle structure, and assuming such for explanation purposes to be to the right in FIG. 4, a contraction is produces in the right ram 90, with the conduit system described resulting in a related contraction occurring in the left ram. As a consequence, relative lateral shifting is resisted.

While several forms of the invention have been described herein, it is appreciated that still other variations and modifications are possible without departing from the spirit of the invention.

I claim:

1. In a vehicle including a frame, a suspension system supporting the frame comprising transversely extending wheel-supported axle means, and a pair of elongated fluid-operated extensible devices disposed adjacent opposite sides of said frame, each device including one port into which fluid flows on extension of the device and another port into which fluid flows on contraction of the device, and being operatively interposed between the frame and the axle means therebeneath and adapted to accommodate relative movement between the frame and the axle means with a change in the effective length of the device, the improvement comprising conduit means operatively interconnecting the devices effective to control fluid flow to and from each device, devices and said conduit means constituting a fluid-filled closed circuit, said conduit means including a valve adjustable between first and second positions, said valve in its first position connecting the one port in each device with the other port in the other device and preventing fluid flow between the one port in each device and the other port in the same device, whereby a change in the effective length of one device causes a similar change in the effective length of the other device, and said valve in its second position connecting the one and the other ports in each device, freeing the devices from each other whereby changes in their respective effective lengths are unrelated.

2. The vehicle of claim 1, wherein each of said devices comprises a cylinder, an elongated rod of substantially constant cross section extending longitudinally through the cylinder and mounted for reciprocation longitudinally thereof, a piston secured to said rod intermediate its ends for reciprocation therewith and forming a pair of fluid-holding chambers in the cylinder with one chamber on one side of the piston and the other chamber on the opposite side of the piston, and said one port opens into said one chamber and said other port opens into said other chamber.

3. The vehicle of claim 1 which further includes an operator's cab and valve adjusting means accessible within the cab for adjusting said valve.

4. The vehicle of claim 3, wherein said valve is positioned adjacent said extensible devices and includes a shiftably valve spool moved in adjusting the valve, and said valve-adjusting means is connected by an elongated cable to said valve spool.

5. The vehicle of claim 1, wherein each extensible device is mounted between the frame and the axle means in such a manner that on extension of the device counterforces are produced along an inclined line, with the inclined lines along which such forces are produced for the two devices sloping toward each other progressing toward the midregion of the vehicle.